United States Patent [19]
Gans

[11] 3,711,790
[45] Jan. 16, 1973

[54] SEGMENTED GLASS LASER
[76] Inventor: Francois F. Gans, 38 rue Gustave Vatonne, Gif-sur-Yvette, France
[22] Filed: April 7, 1971
[21] Appl. No.: 131,986

[52] U.S. Cl. ............................................. 331/94.5
[51] Int. Cl. ............................................... H01s 3/06
[58] Field of Search ..................... 331/94.5; 330/4.3

[56] References Cited

UNITED STATES PATENTS

| 3,311,846 | 3/1967 | Simpson et al. | 331/94.5 |
| 3,487,330 | 12/1969 | Gudmundsen | 331/94.5 |
| 3,500,231 | 3/1970 | Tomiyasu et al. | 331/94.5 |
| 3,569,860 | 3/1971 | Booth | 331/94.5 |
| 3,602,836 | 8/1971 | Young | 331/94.5 |
| 3,611,190 | 10/1971 | Keefe, Jr. | 331/94.5 |

Primary Examiner—William L. Sikes
Attorney—Abraham A. Saffitz

[57] ABSTRACT

Laser device of the neodymium doped glass disc array type. The discs are spaced apart from one another and are immersed in a liquid whose refractive index is equal, for the emission wavelength of the laser, to the refractive index of the glass forming the discs. The disc inclination angle with respect to the disc alignment direction can take any desired value. To pump the discs in the whole volume thereof, the spacing is given a value higher than a predetermined minimal value and an inclination angle of 45° is selected.

2 Claims, 4 Drawing Figures

PATENTED JAN 16 1973

INVENTOR
FRANCOIS F. GANS

BY Abraham␣␣Saffitz

ATTORNEY

INVENTOR
FRANCOIS F. GANS

SEGMENTED GLASS LASER

This invention relates to segmented solid state lasers and more particularly to high energy segmented neodymium glass lasers using an array of discs.

Laser sources make use of the fact that an excited atom, i.e., an atom brought to an energy level higher than that of its ground state emits radiation either spontaneously or under the action of another radiation which it receives. In the former case the emission is known as spontaneous and in the latter case induced. When the optical system is suitable, which means in practice that the emitting substance is enclosed in a Fabry-Pérot interferometer, the induced emission can considerably exceed the spontaneous emission: this is the laser effect.

Amongst other classifications, three types of laser can be distinguished according to the physical state of the laser material. Lasers may thus be solid, liquid or gaseous. Many systems using each of these types have been described and very efficient instruments have been built in each of the three categories.

They nevertheless pose certain technical problems because of practical difficulties inherent to each type of construction.

In lasers where the active medium is a solid material the problem is to produce a homogeneous substance so that the radiation produced is not scattered, diffracted or refracted on its path in the luminous column formed by this substance. The advantage of solids is that the density of the emitting centers is high owing to the condensation of the medium; moreover the active centers are poorly perturbed by the thermal movements of their neighbors, these movements being restricted by the forces holding the crystal lattice.

This is not the case in liquids with which a homogeneous medium is easily obtained; however the interactions due to Brownian motion between surrounding atoms and radiation-producing atoms are considerable, and collisions between the former and the latter lead to deactivation of the excited atoms through non-radiative processes. It is necessary to prevent these interactions by protecting the active centers, enclosing them in chelate molecule cages or solvated ion shields produced for preference with heavy ions. Excellent results have been obtained in this way with lasers in which the elementary sources are neodymium ions $Nd^{+++}$, immersed in a column of liquid selenium oxychloride.

The interactions between active centers and surrounding medium are also weak when the latter is sufficiently dilute: this is the case for gases, and these give lasers which often work efficiently but are generally of very large dimensions; indeed the gain per unit length is hardly more than 1, precisely because of this dilution of the surrounding medium.

The advantages of the disc array lasers are well known in the art. They allow the radiating aperture to be made very large while cooling time remains reasonably rapid because of the small thickness of the disc; also a damaged disc can be replaced more cheaply than a damaged rod and the discs can be made thinner than the self-focusing length so that the threshold for this mode of damage can be raised. The principal drawback of the disc array lasers are their superradiance losses due to stray reflections at the interfaces of the discs which must be prevented by a cladding of absorbing glass onto the neodymium laser glass or by orienting the discs according to the Brewster angle corresponding to the refractive index of the glass.

The object of the invention is to provide a segmented neodymium glass laser with reduced superradiance losses.

Another object of the invention is to provide a segmented neodymium glass laser with large diameter neodymium glass discs which can be pumped up to the central part or core thereof.

According to the invention the active laser medium consists of neodymium glass discs immersed in a liquid with a refractive index identical to that of the laser glass.

In addition to this refractive index condition, the liquid must be transparent at the emission wavelength of the laser and at the pumping wavelength and must not be submitted to photolyse in the spectral region comprising the emitting and pumping wavelengths.

The invention will now be described in detail with reference to the accompanying drawings in which.

Figure 1:
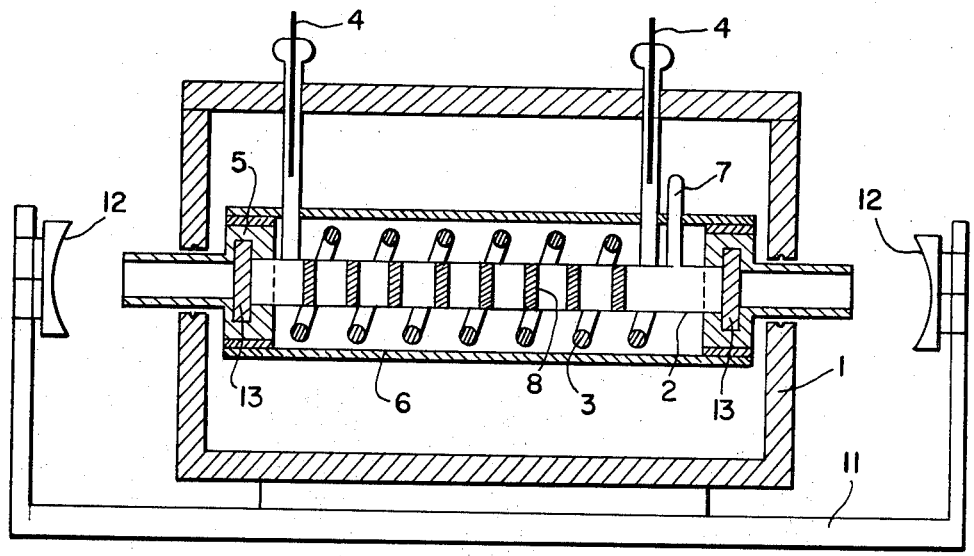
FIG. 1 represents a laser of the invention with parallel discs perpendicular to the laser axis.
Figure 2:
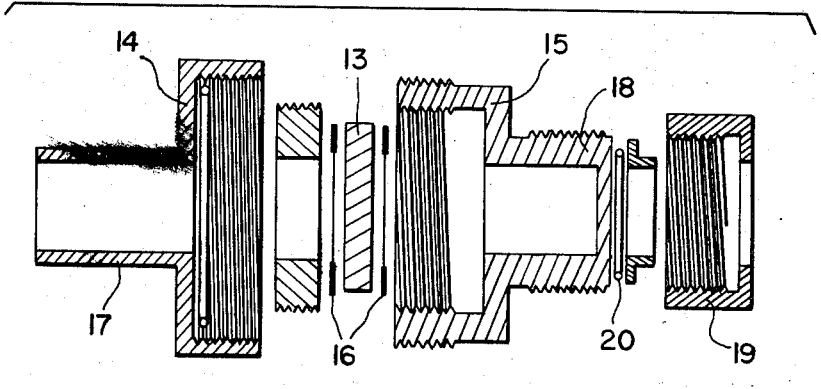
FIGS. 2 and 3 illustrate the details of the apparatus of FIG. 1.

Referring to the Figures, the laser is placed inside a thermostatically controlled chamber 1 and includes a tube 2 containing the active medium, a helical optical pumping lamp 3 ending with electrodes 4 and containing krypton or xenon or a melange thereof, and caps 5 to close the tube 2. The tube 2 and the helical lamp 3 are mounted coaxially. A cylindrical silver mirror 6 is placed around the lamp.

The tube 2 is a "Pyrex" glass tube of 3 cm. internal diameter and 1.5 mm thickness. It is coated externally with an ultra-violet-absorbing layer and is equipped with a side-arm 7 to eliminate gas bubbles from the liquid it contains.

The tube 2 is filled with a number of neodymium-doped crown glass discs 8, 3 cm in diameter and 2 mm thick. The refractive index of this glass for the wavelength 1.058 m$\mu$ is 1.512 at 20° C. The discs are placed in a liquid mixture 9 of carbon sulphide and carbon tetrachloride in the ratio 0.423/0.577 by weight at 20° C. The wall of the tube 2 containing the discs 8 and the liquid 9 is coated with an ultra-violet-absorbent layer.

Figure 3:
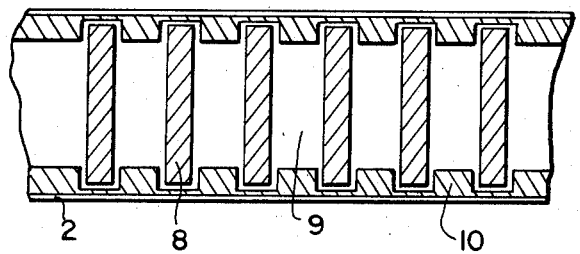

The spacing between the discs is not critical. They may be set in a comb 10 as shown in FIG. 3.

The laser device is placed on an optical bench 11 between two mirrors 12. Each end of the tube 2 is closed by a neodymium-doped crown glass window 13 having a refractive index of 1.512 at 20° for a wavelength of 1.058 millimicrons. This window is clamped between two threaded joints 14 and 15 with interposition of flat joints 16 in polytetrafluorethylene, the threaded joints ending in tubular sections 17 and 18. Onto the tubular section 18 can be screwed a threaded ring 19 in which the tube passes and which serves to grip and O-ring seal 20.

Instead of a carbon sulphide-carbon tetrachloride mixture the following mixtures, it would also be possible to use:

water - barium bromomercurate
water - potassium bromomercurate
chloroform - bromoform
bromoform - carbon tetrachloride the relative quantities of the two liquids in the mixture being calculated to give a refractive index of 1.512.

In a second example the discs are made of calcium fluoride with a refractive index of 1.4286 at the wavelength 1.058 m$\mu$ and the liquid or liquid mixture is one of the following:

water - potassium or barium bromomercurate
bromopentane - pentane

An ultra-violet-absorbing substance is mixed with the liquid in the thermostat 1 to enhance the effect of the layer covering the tube 2 and prevent photolysis of the liquid it contains. This absorbant can be a mixture of cerium and ammonium nitrate dissolved in water in the ratio 1/100 by weight, which eliminates radiations of wavelength below 0.46 m$\mu$.

Figure 4:
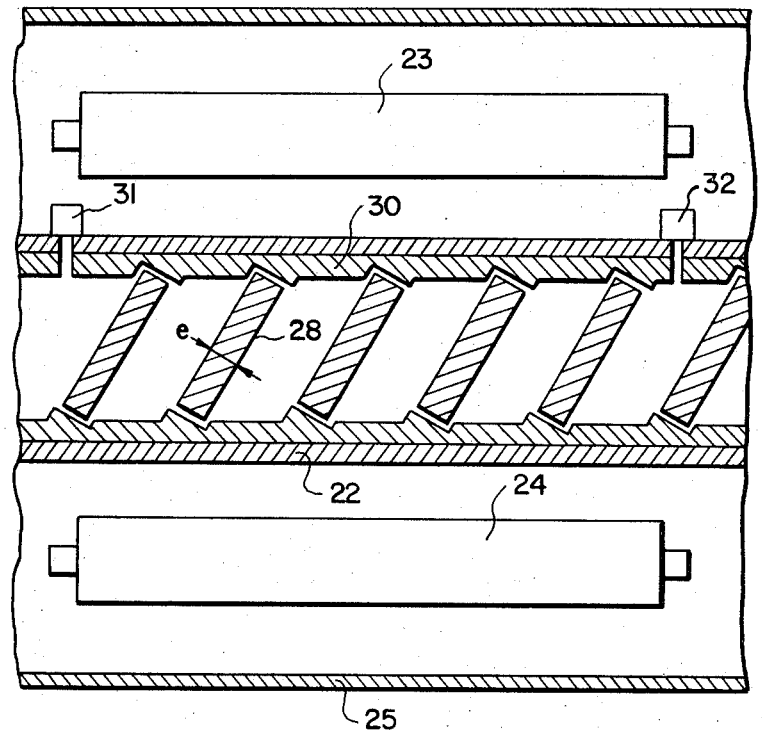
FIG. 4 represents a laser of the invention which parallel discs at 45° with respect to the laser axis.

Referring now to FIG. 4 the tube 22 contains neodymium glass discs 28 which are oriented at 45° with respect to the axis of the tube. The discs 28 are held in position by a comb 30 having inclined grooves and which can be separated in two halves for mounting purposes. The tube 22 is provided with an inlet 31 and an outlet 32 for allowing an appropriate refractive index liquid to circulate by means of a pump not shown and simultaneously cool the emissive discs.

The active tube is illuminated by two flashlamps 23 and 24 parallel to the axis of tube 22 and located in the plane passing through the projection of the tube axis onto the planes of the discs. The flashlamps and the tube containing the segmented neodymium glass are surrounded by a mirror 25. If $d$ and $e$ respectively designate the diameter and thickness of the discs, the spacing therebetween is taken at least equal to
$$(d\ \sqrt{2}/4 + e\ \sqrt{2}).$$
It results that each disc is thus pumped by the lamps up to its center, the first flashlamp pumping a half volume of the disc and the other flashlamp the other half volume. Under these conditions, the weight percent doping in $Nd_2 O_3$ can be increased with respect to the prior art, say from 3 percent to 5 percent.

I claim:

1. A laser device comprising:

a thermostatically controlled chamber;

means for cooling said chamber with a cooling fluid absorbing ultraviolet radiation generated in said device;

said cooling fluid being a mixture of cerium and ammonium nitrate dissolved in water in the ratio 1/100 by weight;

an elongated tube coated with an ultraviolet absorbing layer;

neodymium doped glass discs inserted in said tube and spaced apart in parallel relation to one another by a distance at least equal to
   $$d\ \sqrt{2}/4 + e\ \sqrt{2}$$
   where $d$ and $e$ are respectively the diameter and thickness of the discs;

comb means fitted with grooves for holding said discs parallel to one another;

a liquid mixture of carbon bisulphide and carbon tetrachloride in the weight ratio of 0.423/0.577 which fills said tube and in which the discs are immersed, said liquid mixture having the same refractive index as the glass forming the discs at the wavelength radiated by said laser device and krypton or xenon filled lamp means for optically pumping said discs in the tube whereby an laser emission is effected through a window at end of said tube.

2. A laser device as claimed in claim 1 wherein said comb means are grooved to hold the discs inclined at an angle 45° to the axis of the tube and wherein said pumping means comprises two elongated flash lamps respectively located on both sides of the tube in the plane passing through the tube axis and perpendicular to the discs.

* * * * *